United States Patent [19]

Rosén

[11] 4,330,075
[45] May 18, 1982

[54] SOLDERING TOOL WITH FEEDER MECHANISM

[76] Inventor: Kurt J. Rosén, Kyrkhultsvägen 22, S-280 70 Lönsboda, Sweden

[21] Appl. No.: 129,856

[22] Filed: Mar. 13, 1980

[30] Foreign Application Priority Data

Mar. 16, 1979 [SE] Sweden .................. 7902367

[51] Int. Cl.³ .............................................. B23K 3/06
[52] U.S. Cl. ........................................ 228/53; 228/51; 228/52
[58] Field of Search ................... 228/41, 51, 52, 53

[56] References Cited

U.S. PATENT DOCUMENTS

| 2,843,073 | 7/1958 | Voss et al. ............... | 228/53 |
| 3,171,374 | 3/1965 | Frenzel .................. | 228/53 |
| 3,229,885 | 1/1966 | Hurley ................... | 228/52 |

Primary Examiner—Gus T. Hampilos

[57] ABSTRACT

A soldering tool having a handle, a heating element, and a feeder mechanism for feeding wire or strip soldering metal through a passage in the handle arranged as a unit in an attachment piece let into the handle and comprises a manually operated member which can be depressed towards the handle, and a slide which is displaceable in one direction against spring bias by depression of the manually operated member. The slide has a driving dog for displacement of the soldering metal together with the slide in said one direction to advance the soldering metal towards the tip of the heating element through a guide tube which is arranged on a bracket supported by the handle, to be adjustable in relation to the heating element. A latch member is arranged to prevent backward movement of the soldering metal at the return of the slide under the spring bias in the other direction.

5 Claims, 5 Drawing Figures

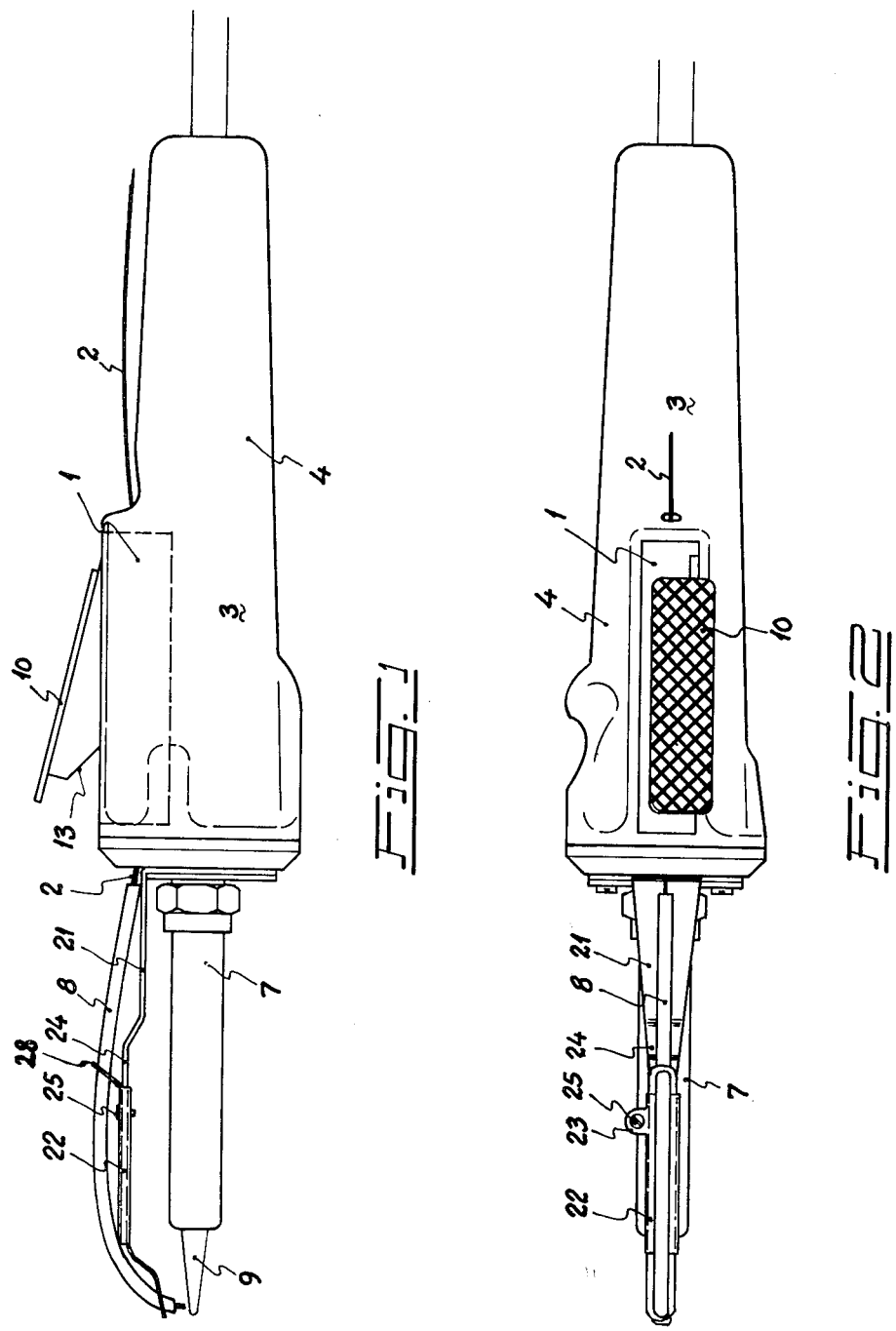

SOLDERING TOOL WITH FEEDER MECHANISM

BACKGROUND OF THE INVENTION

1. Field of the Invention

The present invention relates to a soldering tool having a handle, a heating element, and a feeder mechanism for feeding wire or strip soldering metal, usually tin, through a passage in the handle. The feeder mechanism is arranged such that the manual control of the soldering tool towards the junction as well as the feed of the soldering metal can be performed by one hand, while the operator can control and fix the parts involved in the soldering, by the other hand.

2. Description of the Prior Art

In soldering operations, particularly such operations wherein the components involved are very small, e.g. in the electronic industry, great difficulties may be encountered in soldering. The components may change their location when contacted by the soldering tool and they may be difficult to fix before the soldering metal has solidified and has bound the components involved. Considering the small space available in constructions having frequent junctions, auxiliaries supporting the components before fixing cannot be used. Stationary fixtures with holders can be used only exceptionally or in limited assembly steps while such fixtures in complicated and compact units will provide an operational obstacle so that the accessibility required will not be afforded to the operator.

For a satisfactory result of the soldering operation the operator therefore has to support the components involved and to fix such components in the positions wherein they should be located after the soldering, by one hand. The problem is that the soldering tool held by the other hand, at each soldering operation must be provided with a suitable portion of soldering metal before the soldering can take place. This is a time-consuming step, and moreover it is necessary for the operator to take his eyes off from the soldering position and to concentrate on the portioning of the soldering metal onto the soldering tool, such portioning being carried out outside the region in which the soldering has to take place. Thus, the person performing a soldering operation by applying the present technique, particularly in compact and concentrated constructions, has to be observant of two different operational steps at one and the same time, which is rather difficult. The position of the components may be inadvertently changed as a consequence thereof.

The Swedish patent specification No. 342,756 discloses a soldering tool which eliminates said disadvantages. This tool comprises a slide which is operatively connected to a manually operated member over a rack and pinion mechanism to be reciprocated when said member is operated. On the slide there is provided a driving dog which engages a soldering metal wire when the slide is moved in one direction so that the wire is carried along by the slide. The wire is released when the slide is moved in the other direction the wire then being held in fixed position by a latch member. By this mechanism the wire is advanced stepwise in a passage extending through the heating element and opening at the tip thereof, for supplying soldering metal directly to the junction to be soldered.

This prior art feeder mechanism is complicated, and the entire tool is of a specific structure in order to have the feeder mechanism embodied therein.

SUMMARY OF THE INVENTION

It is a primary object of this invention to provide a new and improved soldering tool wherein the feeder mechanism is arranged as a unit mounted to the handle of the tool which can be substantially of the form and structure usually applied to soldering tools.

It is a further object of the invention to provide a soldering tool wherein the passage through which the soldering metal wire or strip is guided towards the tip of the heating element can be adjusted to such elements of different sizes.

A still further object of this invention is to provide a soldering tool having a feeder mechanism, which has a small volume so that it is well suited for use in compact and concentrated constructions.

To achieve the foregoing objects the soldering tool of this invention is of the type having a handle and a heating element, and comprises a feeder mechanism for feeding wire or strip soldering metal through a passage in the handle, having an attachment piece let into the handle, a slide displaceably guided by the attachment piece, spring means biasing the slide in the feeding direction of the soldering metal, a manually operated member pivoted to the attachment piece and forming an inclined surface for engagement with the slide and displacement thereof against the spring bias at depression of said member towards the handle, a driving dog on the slide for advancing the soldering metal at the displacement of the slide against the spring bias, and a latch member on the attachment piece for gripping the soldering metal at displacement of the slide under the spring bias; and further comprises a bracket supported by the handle, which extends along the heating element, a guide tube for guiding the advanced soldering metal towards the tip of the heating element, and means for adjusting the guide tube in relation to the heating element.

It is preferred that the bracket comprises a part supporting the guide tube, which is adjustable along the heating element in relation to the rest of the bracket and can be fixed in the adjusted position.

It is also preferred that the guide tube comprises a flexible tube extending along the heating element, which is passed through guide lugs on said part, said tube being curved towards the tip of the heating element.

The accompanying drawings, which are incorporated in and constitute a part of this specfication, illustrate an embodiment of the invention and, together with the description, serve to explain the principles of the invention.

BRIEF DESCRIPTION OF THE DRAWINGS

Of the drawings:

FIG. 1 is a side view of a soldering iron according to a preferred embodiment of the invention;

FIG. 2 is a plan view of the soldering iron in FIG. 1;

DESCRIPTION OF THE PREFERRED EMBODIMENTS

Figure 3:
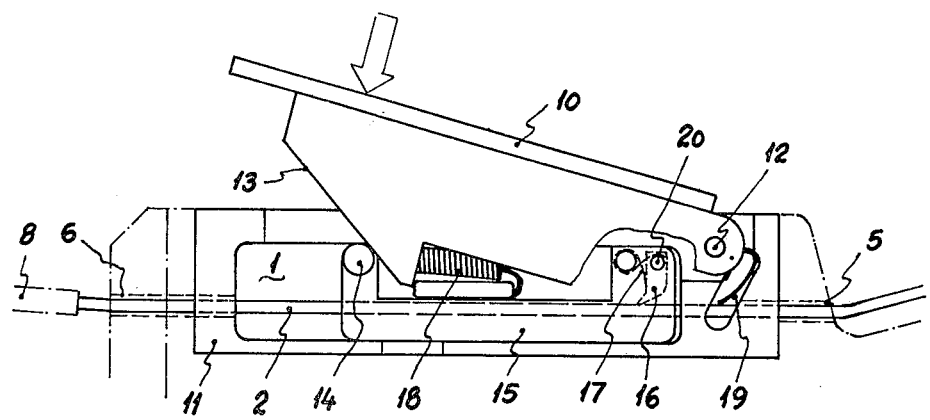
FIG. 3 is an enlarged side view of the feeder mechanism with the finger piece in a neutral position.

Referring to the drawings, the soldering iron 3 disclosed therein is of a conventional structure having a handle 4 and a heating element 7.

A feeder mechanism 1 by means of which a soldering wire 2 can be advanced at the rate required in portioning soldering metal to a soldering position is incorporated into the handle 4 as a separate unit. The soldering wire is passed through a rear opening 5 provided in the handle, through the feeder mechanism and through an opening 6 provided in the handle adjacent the heating element 7, and is then guided by a guide tube 8 to the tip 9 of the heating element.

Figure 4:
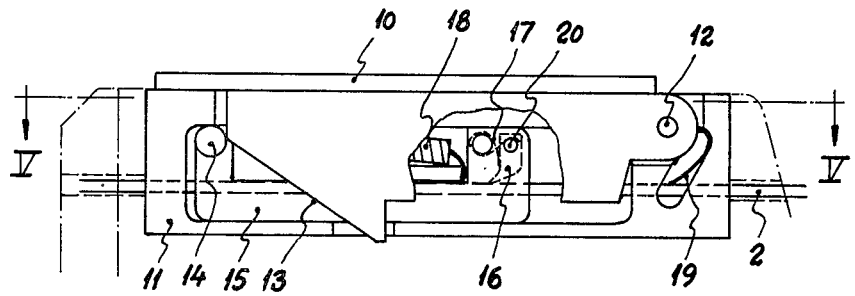
FIG. 4 is a view corresponding to FIG. 3 with the finger piece in a depressed position.
Figure 5:
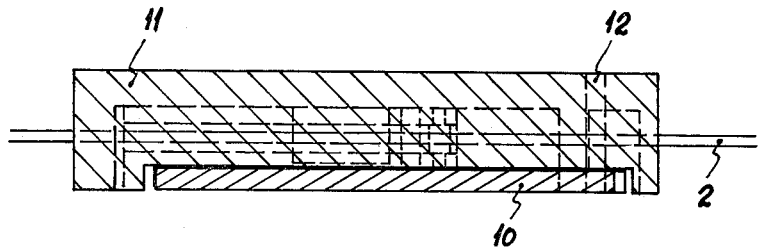
FIG. 5 is a cross-sectional view taken along line V—V in FIG. 4.

The feeder mechanism has in the upper portion thereof a finger piece 10 pivoted to an attachment piece 11 by means of a pin 12. The finger piece can be depressed to the lower position shown in FIG. 4 with a finger of the hand holding the soldering iron at the handle 4. Then, an inclined surface 13 of the finger piece is pressed against a roller 14 which is rotatably mounted to a slide 15 guided in the attachment piece 11, which is displaced towards the heating element 7 against the bias of a tension spring 18 engaged between the attachment piece and the slide. At this movement a driving dog 16 pivoted to the slide by a pin 20 and biased against the soldering wire 2 by a spring 17 engages the soldering wire, a feeding step which corresponds to the movement of the slide being obtained. At the return movement of the slide under the bias of the tension spring 18 when the pressure on the finger piece 10 is relieved, the soldering wire is latched by a plate spring 19 which has such profile that it engages the soldering wire if it tends to move back from the heating element, but allows the advance movement of this wire. The driving dog 16 has at the point of engagement with the soldering wire an inclined surface in order to slide on the soldering wire at the return movement of the slide.

In order that the soldering wire shall be guided towards the tip 9 of the heating element 7 a flexible guide tube 8 made of a plastics material extends between the handle 4 and the tip 9. The tube is attached to a composite bracket 21. This comprises an attachment 22 provided with apertured lugs 23 wherein the guide tube is secured in the appropriate position. The attachment 22 is mounted to an angled piece 24 attached to the handle, such that it is slidable on said piece and can be displaced thereon in order to provide the proper bracket length adapted to heating elements of different sizes. The attachment 22 is locked to the angle piece 24 by means of a clamp 28 with a screw 25.

Thus, it will be seen that the supply of soldering metal 2 to the tip 9 of the heating element can be effected by operating the finger piece 10 with a finger of the hand holding the soldering iron 3 at the handle 4. This makes possible to simplify the soldering steps and to optimize the quality of the soldered junction and also to locate and fix the components involved in exact positions most appropriate for the construction by the other hand.

It will be apparent to those skilled in the art that various modifications and variations could be made in the soldering tool described without departing from the scope and spirit of the invention.

I claim:

1. A soldering tool comprising, in combination; a handle; a heating element; and a soldering tip at one end of the handle; a solder passage formed by the handle and extending between rear and front openings; a solder-feeding mechanism within the handle in said passage for advancing solder towards said heating element, and including an attachment piece in the handle; a slide displaceably guided by the attachment piece; spring means biasing the slide in a direction opposite to a feeding direction of solder through the passage; a slide control member pivotably attched to the attachment piece and accessible for manual operation from outside of the handle, said slide control member forming an inclined surface for engagement with the slide and displacement thereof against the spring means upon pivoting said member with respect to the handle; a driving dog on the slide for advancing the solder upon displacement of the slide against the spring bias, and a stationary latch member on the attachment piece for gripping the solder upon displacement of the slide under the spring bias; the solder-feeding mechanism further comprising a bracket supported by the handle, and extending along the heating element, said bracket including a first element connected to the handle at one end thereof; and a second element supported by the first element to be adjustable to selected positions along the heating element; and a guide tube for receiving and guiding solder supplied from the front opening of the passage around the heating element to the soldering tip; said guide tube being supported by said second element and extending towards the soldering tip, said bracket allowing adjustment of the guide tube in the longitudinal direction of the heating element towards and away from the soldering tip.

2. A soldering tool according to claim 1 wherein the stationary latch member comprises a plate spring having a curved profile to slide on solder in the attachment piece upon movement of the slide in the feeding direction and to engage with solder in the attachment piece in order to prevent movement thereof in the opposite direction.

3. A soldering tool according to claim 1 or 2 wherein the second element can be fixed in the adjusted position.

4. A soldering tool according to claim 3 wherein the guide tube comprises a flexible tube extending along the heating element, which is passed through guide lugs on said second element, said tube being curved towards the soldering tip.

5. A soldering tool according to claim 1 wherein the spring bias means is a tension spring.

* * * * *